United States Patent
Höllriegl et al.

(10) Patent No.: US 7,748,518 B2
(45) Date of Patent: Jul. 6, 2010

(54) CONTAINER-GRIPPING DEVICE

(75) Inventors: Thomas Höllriegl, Teublitz (DE); Bernhard Düzinger, Unterdeggenbach (DE); Erwin Knieling, Pfatter (DE); Heinrich Deyerl, Tenuz (DE)

(73) Assignee: Krones AG, Neutraubling (DE)

( * ) Notice: Subject to any disclaimer, the term of this patent is extended or adjusted under 35 U.S.C. 154(b) by 263 days.

(21) Appl. No.: 11/667,810

(22) PCT Filed: Nov. 10, 2005

(86) PCT No.: PCT/EP2005/012017

§ 371 (c)(1), (2), (4) Date: Mar. 3, 2008

(87) PCT Pub. No.: WO2006/050935

PCT Pub. Date: May 18, 2006

(65) Prior Publication Data

US 2009/0000909 A1    Jan. 1, 2009

(30) Foreign Application Priority Data

Nov. 15, 2004   (DE) .................... 10 2004 055 098

(51) Int. Cl.
B65G 25/00  (2006.01)

(52) U.S. Cl. .............. 198/470.1; 198/803.3; 198/469.1

(58) Field of Classification Search .............. 198/466.1, 198/469.1, 470.1, 478.1, 867.07, 803.3, 803.9
See application file for complete search history.

(56) References Cited

U.S. PATENT DOCUMENTS

| | | | | |
|---|---|---|---|---|
| 2,415,997 A * | 2/1947 | Eldred | .................... | 198/470.1 |
| 2,928,705 A | 3/1960 | Goldsmith | | |
| 6,302,172 B1 * | 10/2001 | De Villele | ................ | 198/470.1 |
| 6,354,427 B1 * | 3/2002 | Pickel et al. | ............. | 198/470.1 |
| 6,399,901 B1 * | 6/2002 | Nishino et al. | ................ | 177/52 |
| 6,488,449 B1 * | 12/2002 | Laquay et al. | ........... | 198/466.1 |
| 6,520,318 B1 * | 2/2003 | Humele | ................... | 198/470.1 |
| 6,796,342 B2 * | 9/2004 | De Antoni Migliorati et al. | ....................... | 198/470.1 |
| 7,104,390 B2 * | 9/2006 | Hiramoto et al. | ......... | 198/466.1 |

FOREIGN PATENT DOCUMENTS

| | | |
|---|---|---|
| DE | 37 13 016 A1 | 10/1988 |
| EP | 0 939 044 B1 | 9/1999 |
| GB | 1 301 335 A | 12/1972 |
| GB | 2 204 307 A | 11/1988 |

\* cited by examiner

Primary Examiner—James R Bidwell
(74) Attorney, Agent, or Firm—Marshall, Gerstein & Borun LLP

(57) ABSTRACT

A method and a device for transporting containers, which present a support ring or similar part, where the containers to be transported move through at least one transfer area, in which they are held by gripping elements alternately on different sides of the support ring, and the gripping elements present an identical direction of movement at least in the transfer area.

32 Claims, 5 Drawing Sheets

CONTAINER-GRIPPING DEVICE

CROSS-REFERENCE TO RELATED APPLICATION

The present application claims the benefit of priority of International Patent Application No. PCT/EP2005/012017 filed on Nov. 10, 2005, which application claims priority of German Patent Application No. 10 2004 055 098.0 filed Nov. 15, 2004. The entire text of the priority application is incorporated herein by reference in its entirety.

FIELD OF THE DISCLOSURE

The disclosure relates to a method for transporting containers that present a support ring or similar part, and to a device for transporting such containers.

BACKGROUND OF THE DISCLOSURE

In the field of food packaging, bottles made of PET (polyethylene terephthalate) are enjoying increasing favor. During their manufacture, these containers are manufactured from preforms. During the manufacturing process, the preforms move through different processing machines, each carrying out different processes on the preforms. To optimize the handling, they present a support ring, on whose top or bottom side they are held while they move through different processing machines. During the transport between the processing machines, the preforms are also held and transferred above or below the support ring. Thus, the transport of the preforms is often substantially without bottom support through the processing machines and the intercalated transport and transfer devices. If containers are transferred, then each one can only be gripped alternately above and below on the support ring.

The Patent DE 37 13 016 A1 describes such an alternate gripping of plastic bottles above or below the support ring. During the entire transport through different machines, rotating stations and transfer areas, the bottles are supported or guided by the neck collar, practically without bottom support.

In such transfer methods, and in such devices, one problem that arises is that between two processing machines, both of which contact below or above the support ring, transfer devices, such as, for example, transfer stars, have to be used, because it is not possible to repeatedly grip the container at the same place, either above or below the support ring.

SUMMARY OF THE DISCLOSURE

The problem of the present disclosure therefore is to provide a method and a device which allow gripping the container without an additional transfer device, simplify substantially the handling of containers in processing machines, and reduce substantially the construction cost as a result of the omission of additional transfer devices.

The transport method is carried out preferably with bottle-like containers which present, above the support ring, a mouth area, and, below the support ring, a neck, body and bottom area. However, it is not excluded to transport other containers, such as, for example, bags (so-called pouches), which present a support ring, with the help of this method. Only the support ring is obligatory for this transport method.

A support ring is any part that fulfills the functions of the support ring. Thus, it is also possible to transport containers with a closure ring or a similar part. It is important that a protruding part or a recess part is present, so that the container can be held and gripped securely on or in it.

In the described transport method, the containers move through a transfer area which is preferably at least partially on a circular track. However, the transfer area can have a linear design. In this transfer area, several gripping elements are present, which alternately contact the mouth and/or the neck, body or bottom area of the container. The gripping elements are preferably present in pairs in the transfer area. In a preferred embodiment, they are also attached one above the other, so that they overlap at least partially, preferably radially. The gripping elements, in a preferred embodiment, turn here about a common rotation axis in two parallel, superposed claims. The gripping elements are designed preferably as laterally attacking clamps with two lever arms that can be tilted in opposite directions.

In a preferred embodiment, a plane is formed with gripping elements, as a transfer wheel which rotates about the common rotation axis. The gripping elements are, in each case, attached to an endless conveyor, such as, for example, a chain.

The gripping elements of at least one plane are preferably designed so that they can also be shifted in the radial direction. As a result, containers which are located in a processing machine before the transfer area can be transferred by radially moving out a gripping element into the transport device. During the radial movement into the retracted position, the preform can now be inserted into the gripping element located below it.

In the process, it is possible for either one gripping element to hold the container at the support ring above the support ring, and the other gripping element to hold the container at the support ring below the support ring, or for one a gripping element to hold the container above the support ring, and the other gripping element to hold the container below the support ring at the body and/or at the bottom area.

In a preferred embodiment, the radially movable gripping elements can be controlled actively, to actively grip the containers to be received. The containers that rotate in the other plane are preferably passively controllable gripping elements.

The transfer of the containers into the transfer area, and the gripping on the container from above downward, or vice versa, occur preferably during the movement of the gripping elements. It is also conceivable to control the gripping elements in cycles, during the transfer of the containers.

The radial movement of the gripping elements with respect to the common rotation axis is carried out preferably by cam controls. In another embodiment, it is also conceivable to achieve the radial control of the gripping elements by pneumatic or hydraulic devices. For this purpose, guides, for example, slide rails, are present, which guide the gripping elements during their radial movement.

With the help of the transport device, bottle-like containers are preferably transported, which present a mouth area above the support ring, and a neck, body and bottom area below the support ring. However, it is not ruled out that other containers, such as, for example, bags (so-called pouches) which present a support ring, are transported with the help of this device.

The transport device is preferably designed so that the gripping elements are attached to an endless transport element, such as, for example, a transport chain. In a particularly preferred embodiment, the gripping elements, at least in the transfer area, where they occur preferably in pairs and are aligned in the axial direction, present the same spacing, in two planes of transport of superposed elements. If a common rotation axis is present, then, in case of an identical spacing, they rotate at the same speed. However, an embodiment is also conceivable in which the circumferential speeds of the gripping elements about the rotation axis are controlled in such a way that they are superposed only in the transfer area, and move apart from each other outside of the transfer area.

In a preferred embodiment, the separation between the parallel planes, in which the given gripping elements circulate, has a size such that the gripping elements can engage above or below the support ring, without additional movements or change the height. It is preferred that at least the gripping elements that are radially mobile are actively controllable by cams, pneumatic cylinders or hydraulic cylinders. Other active controls are conceivable and not ruled out. In an additional embodiment, all the gripping elements are actively controllable. They are designed, for example, according to the European Patent EP 0939044B1.

In a preferred embodiment, in each case one gripping element of a gripping element pair assigned to a container is controlled actively, and one gripping element is controlled passively, such as, for example, by a spring, where it is preferred that the actively controllable gripping element is the element that takes over the container from the previous processing machine. The gripping elements which take over the containers from the previous processing machine move preferably in a closed circular track. In a preferred embodiment, they are designed in the form of a transport star which rotates about the common rotation axis. The gripping elements, into which the containers are transferred in the transfer area, circulate preferably in a longitudinal track with two rotation axes.

The two circulating transport elements present the same radius R only in the transfer area.

The processing units are located preferably in the straight areas of the longitudinal section. They are inspection units for the inspection of the bottom, the inspection of the lateral wall, and also for controlling the mouth, as well as labeling units, such as, laser or ink jet labeling units, or container cooling units. It is also conceivable to accommodate other, additional, processing units.

The container cooling units can be of different designs. One possibility consists in arranging stationary nozzles inside the container cooling unit, which spray the container from below, from the side, or from above, with air or a liquid medium, such as, for example, water. If air cooling is used, then, according to a preferred variant of the disclosure, recycling air from the processing machine is used.

Another possibility for container cooling consists in associating a cooling element with each container, at least in the container cooling unit, where the cooling element can be placed in engagement with parts of the external wall of the container, preferably the bottom area. Here the container cooling units preferably move in the same pattern as the container.

Such a container cooling unit can be, for example, a bottom cup, which presents substantially the contour of the container. It is preferred for cooling ducts to pass through the bottom cup, through which ducts a cooling medium can flow, allowing heat to be exchanged at the time of the engagement of the bottom cup with a container.

Additionally, a vacuum can be applied to the bottom cup, so that the container is sucked firmly against the bottom cup, on the one hand, to improve the engagement and thus also achieve a cooling effect, and, on the other hand, to maintain the container in the bottom cup, without having to grip it by the neck collar. As a result, it is possible to carry out—temporally limited—processing processes in the area of the container mouth, during which the gripping elements at the container neck area interfere.

An additional possibility of container cooling consists in introducing a cooling medium into the bottom cup and then immersing the container with the bottom in the bottom cup. Such a cooling medium can be, for example, water or nitrogen.

The advantage of accommodating processing units in the longitudinal area is that the containers are in a fixed spacing ratio, allowing certain processes to be carried out better, or at all.

According to a preferred embodiment, the processing units are constructed in such a manner that they can be removed or added in a modular way. Thus, it is also possible for only one of the mentioned processing units to be accommodated in the longitudinal area. The endless circulating transport element must then be shortened or elongated accordingly.

BRIEF DESCRIPTION OF THE DRAWINGS

Below, embodiment examples of the disclosure are described in greater detail with reference to the drawing. In the drawing.

DETAILED DESCRIPTION OF THE DISCLOSURE

Figure 1:
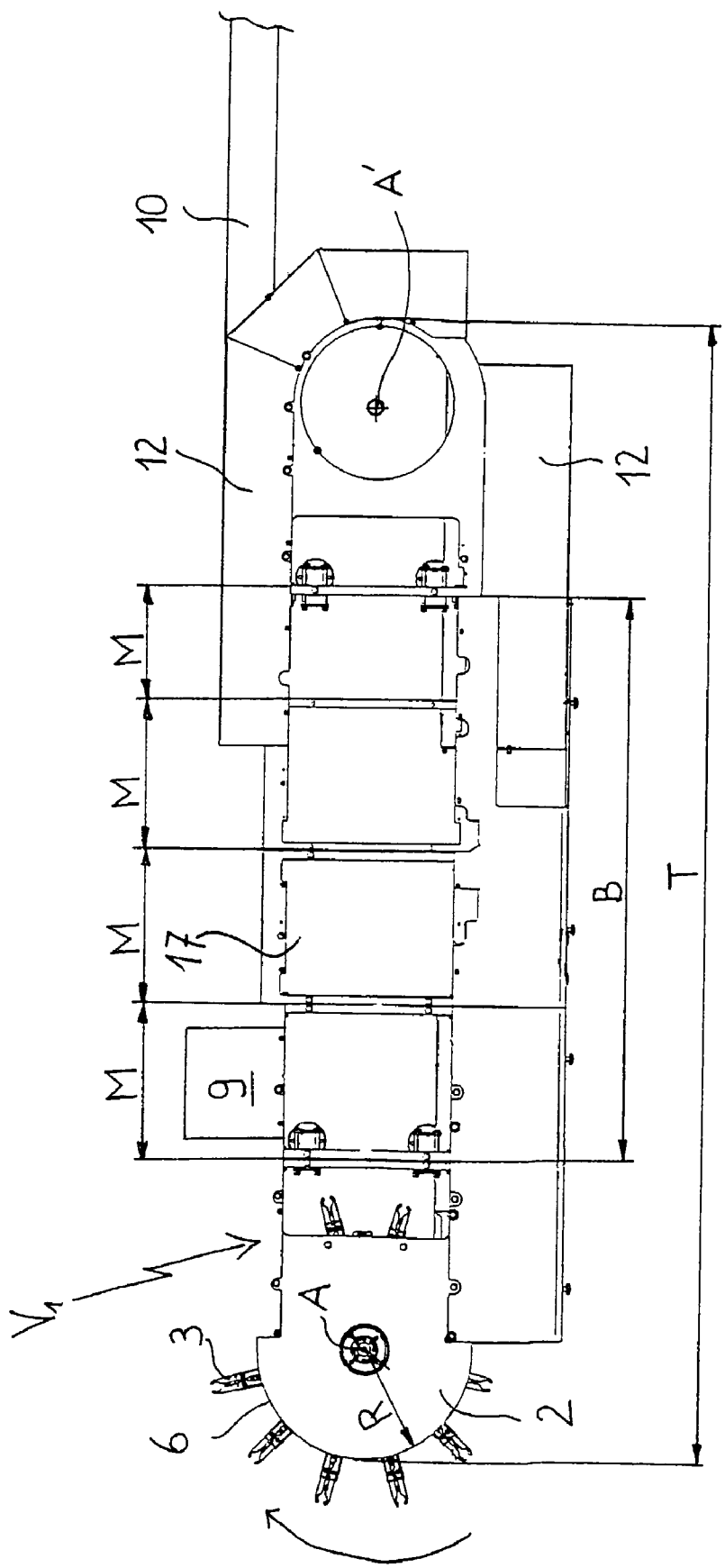
FIG. 1 shows a top view of a first embodiment of a device.

FIG. 1 shows the transfer area 2 in the device V1, where the area is located on the left end of the transport section T. In the transfer area 2, an endless transport element, not shown here, moves about the common rotation axis A, and gripping elements 3 are attached to it. The circulation of the endless transport element, and thus also of the gripping elements 3, occurs about the common rotation axis A at a separation R from the common rotation axis A along a circular element 6. Additional gripping elements 3", which are associated with the gripping elements 3 represented here, and lie in a parallel plane, are not shown to simplify the illustration. They are attached to a traction means, such as, for example, a chain, a belt, or a similar part, and they protrude out of these means, laterally seen in the direction of transport. However, these gripping elements 3" do not move completely about the common rotation axis A, as the gripping elements 3 represented here do, rather, after having moved through the semicircular elements 6, they are immersed in a rectilinear movement track along the section B. There, they pass successively through the different modules M, to which different processing units 8, 9, 11, 17 can be attached. A side wall inspection machine 9 is shown here, which is attached to the first module M, laterally seen in the direction of movement, and a container cooling installation 17 is shown, which is illustrated in greater detail in FIG. 5.

The side wall inspection machine consists advantageously of an illumination body with facing screen (both are not shown); it detects damage or unwanted changes to the preform or to the bottle after it has been completely molded. The illumination body and the screen are arranged here perpendicularly to the left and the right, seen in the transport direction, next to the transport section T.

Although only one processing unit 9 is present here, four modules in total form the area B. As a result, a buffer section can be generated between a processing machine 4 (FIG. 2) and the container removal device 10.

After having moved through the modules M and along the section B, the containers are transferred to a container removing device 10. In this case, the latter is an air conveyance device. While the containers 1 continue to be transported to the next processing machine, the now empty gripping elements 3" move about the axis A' and along the transport section T back to the transfer area 2, where they again receive containers 1 from the previous processing machine 4. At least some parts of the transport section T are surrounded by a transport element protection 12, to prevent any risk of injury to the operating personnel.

Figure 2:
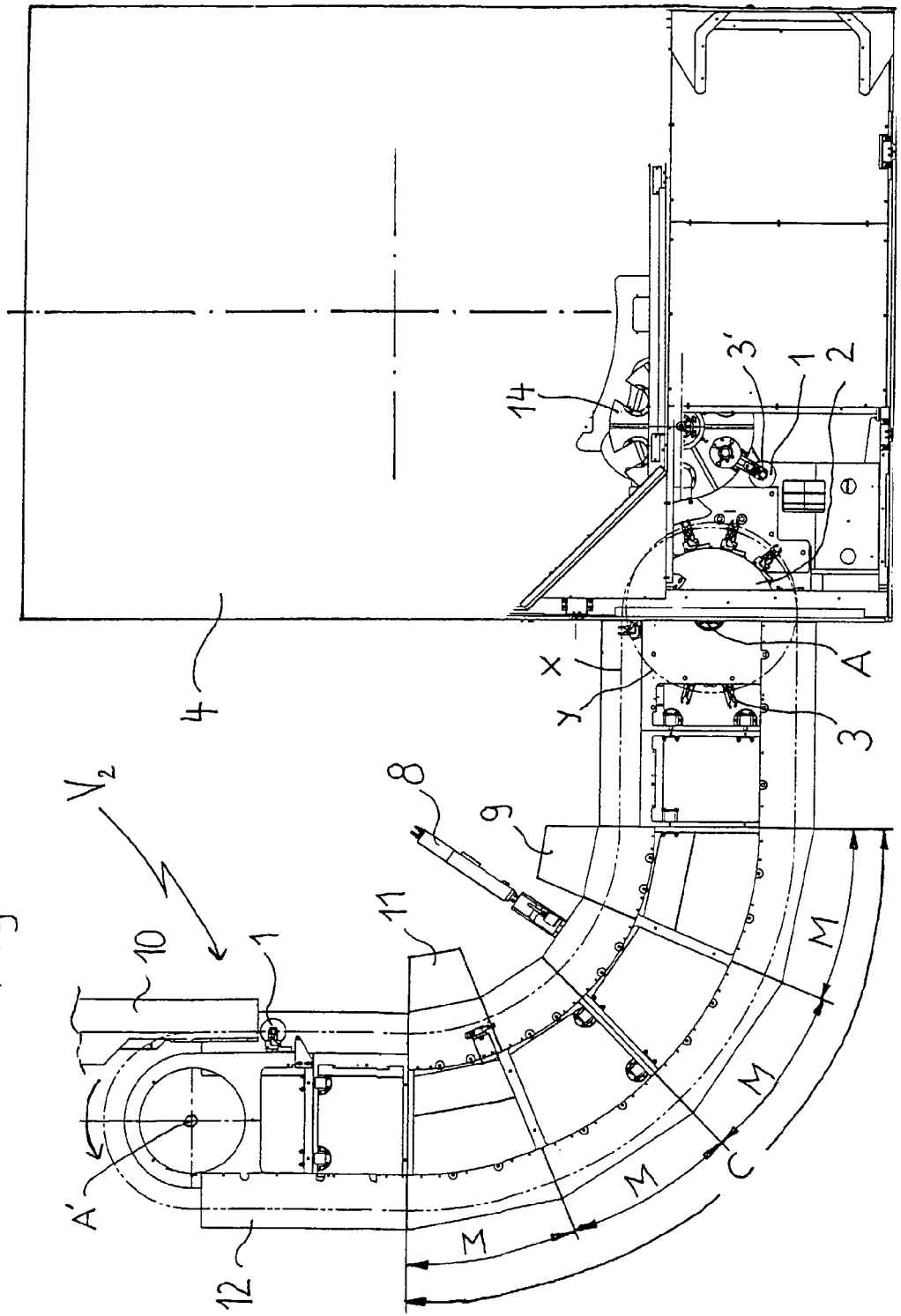
FIG. 2 shows a top view of a second embodiment.

FIG. 2 shows with V2 another embodiment of the device according to the disclosure. Here too, the processing machine 4, which is connected before the transport device, is shown. In this case it is a stretch molding machine 4, which molds the PET preforms to PET bottles. The containers 1, after they have been molded completely in the processing machine 4, are taken over by a transfer star 14 from molds that are not shown here. Because the bottles manufactured in the processing machine 4 are applied with the bottom side of the support ring 16 against the top side of the molds, they can be gripped only above the support ring 16 by the gripping elements 3' of the transfer star 14. As they are held in this way, they are transported clockwise in the direction towards the transfer area 2. The gripping elements 3' of the transfer star 14 are synchronized in the transfer area 2 with the gripping elements 3 so the position is correct, and a transfer of the containers 1 can occur.

In the transfer area 2, gripping elements 3 and 3" are arranged in pairs, in two superposed offset rotating planes Uu and Uo, where the gripping elements 3 located in the lower rotation plane Uu are moved along a track Y about the common rotation axis A on a circular track, and the gripping elements 3", located in the upper rotation plane Uo, are moved along a track X. The track Y has substantially the shape of a circular track, while the track X has substantially the shape of an L, that is it forms a 90° angle. In the transfer area 2, the container 1, which is gripped in the transfer star 14 by the gripping element 3' above the support ring 16, is now transferred to the lower gripping element 3, which is moved along the track Y. To prevent the superposed gripping elements 3 and 3" from interfering mutually in the transfer area 2 at the time of the transfer of the containers, the lower gripping element 3 can be shifted radially outward in the direction towards the transfer star 14. The transfer of the container 1 from the facing gripping element 3' is carried out in this exposed position under the support ring 16. During the clockwise rotation of the gripping elements 3 about the common rotation axis A, the gripping element 3, which is located below and now holds the container, is now retracted radially in the opposite direction from its exposed position. The effect of this retraction is that the container 1 is taken up above the support ring 16 by the upper gripping element 3" which moves along the track X. At the time of the transfer, a gripping element 3 or 3" is located both above and also below the support ring 16 of the container 1. As soon as the container 1 is securely held by the gripping element 3" located in a top position, the lower gripping element 3 is opened actively. Thus, the container 1 can move further along the track X through the transport device.

Four modules M, forming the section C, are again located between the transfer area 2 and the container removing device 10. The modules M are here arranged in such a way that the containers 1, during the transport along the track X, present a direction of transport which is shifted by 90° with respect to the direction of removal out of the processing machine 4. Thus, the section C forms a 90° angle.

During the transport along the track X, the containers 1 move through the modules M to which a side wall inspection machine 9, a laser labeling unit 8 and a mouth inspection machine 11 are attached. In the area of the container removal device 10, which here is formed by an air conveyor, the gripping element 3" separates from the support ring 16 of the container 1, releasing the latter to be transported away.

As a result, the gripping elements 3", which move in the track X, move along a semicircle about the second rotation axis of the transport device A'. In the return area leading to the transfer area 2, the gripping elements 3" are surrounded completely by a transport element protection 12.

Figure 3:
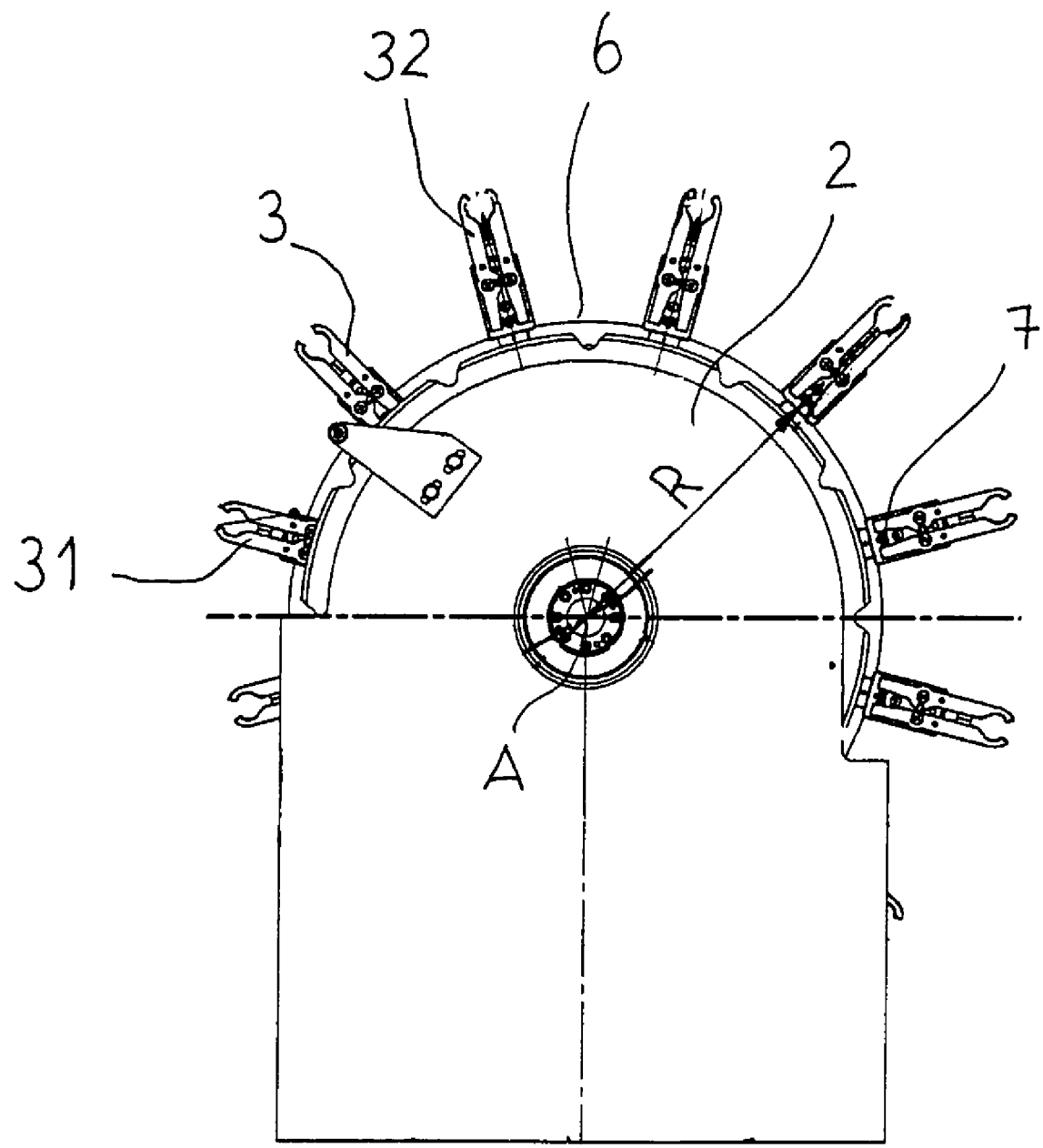
FIG. 3 shows an enlarged top view of the transfer device of the embodiments of FIGS. 1 and 2.

FIG. 3 shows the gripping elements 3 which are located at the bottom in the transfer area 2 and move along the track Y of FIG. 2. The gripping elements 3", which are located at the top and move along the track X, are not included in the drawing to simplify the illustration.

The gripping elements 3, which can be shifted radially with respect to the common rotation axis A, are actively controllable gripping elements 3 that can be opened or closed by the actuation of a cam 7 via actuation devices arranged on the circumferential track.

The fact that the gripping elements 3 can be shifted radially with respect to the common rotation axis A can be seen clearly from the positions of the gripping elements 31 and 32. With reference to the common rotation axis A, the gripping element 31 is in a radially more internal position than the gripping element 32.

Figure 4:
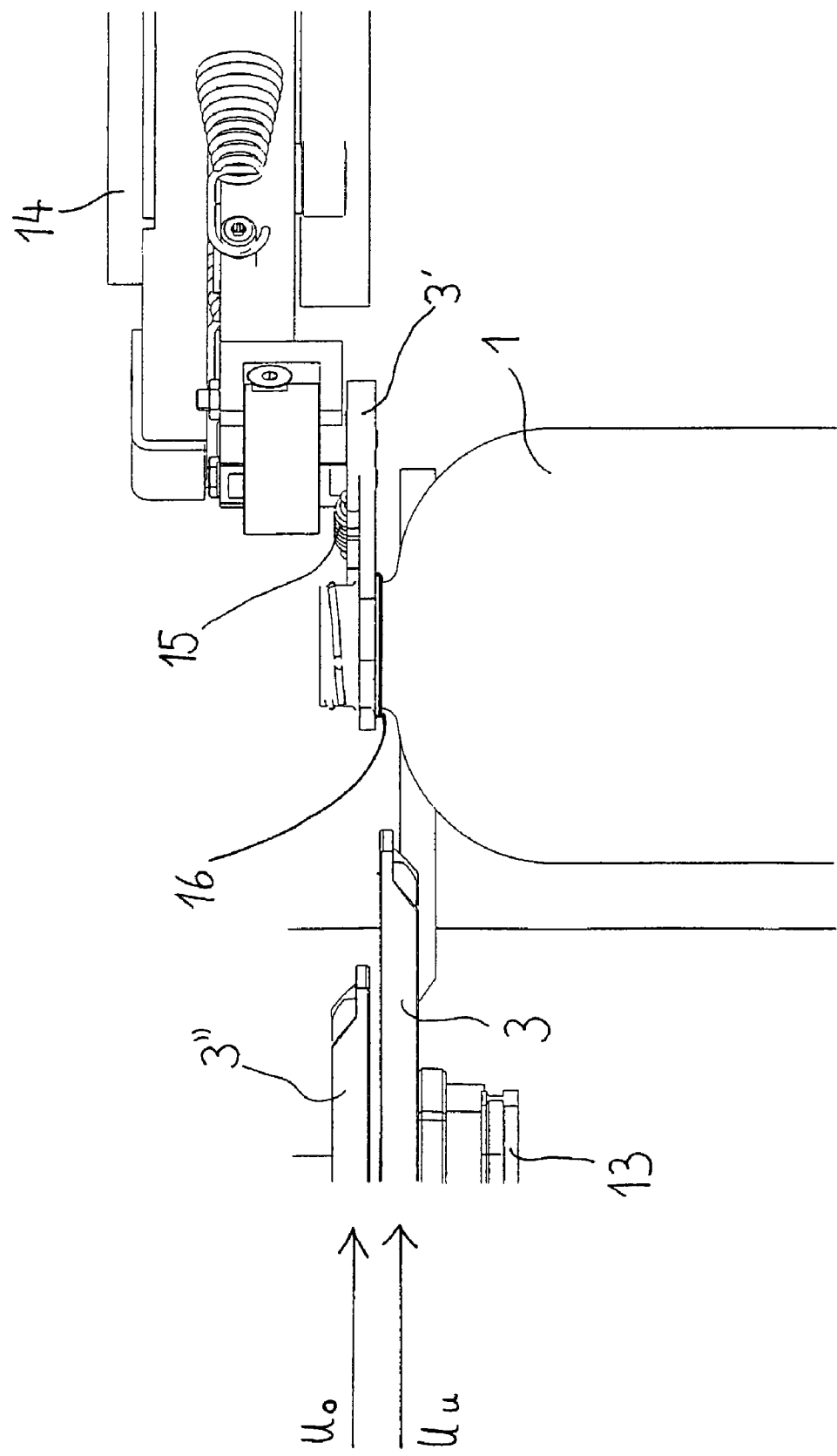
FIG. 4 shows a side view seen from the direction X in FIG. 2 of a part of the transfer device and of the processing machine according to a device of the disclosure.

FIG. 4 shows the transfer of the container 1 from the gripping element 3' of the transfer star 14 to the gripping elements 3 and 3" of the transfer area 2. The container 1 is held passively above the support ring 16 by a gripping element 3' which is controlled by a spring 15. To take over the container 1, the lower gripping element 3, which is in the plane Uu, moves along the radially oriented rail 13 into an exposed position which is located further outward. From there, it grips, actively controlled, the container 1 under the support ring 16. Subsequently, the lower gripping element 3 is retracted along the rail 13 out of its exposed position in the opposite direction, pulling as a result the container 1 out of the gripping element 3'. The gripping element 3' is passively exposed to pressure by a spring 15, that is, it is not actively controlled. The movement of the gripping elements 3 along the rail 13 is not predetermined by the represented control cams.

As a result of the retraction of the exposed position of the lower gripping element 3 along the rail 13, the container 1 is pulled between the gripping arms of the upper gripping element 3", which is located in the plane Uo and also exposed to pressure by the spring. Now, the lower gripping element 3 can release the container 1 in a controlled way, with the result that the container moves with the upper gripping element 3" (as shown in FIG. 2) along the track X in the direction towards the container removing device 10.

Figure 5:
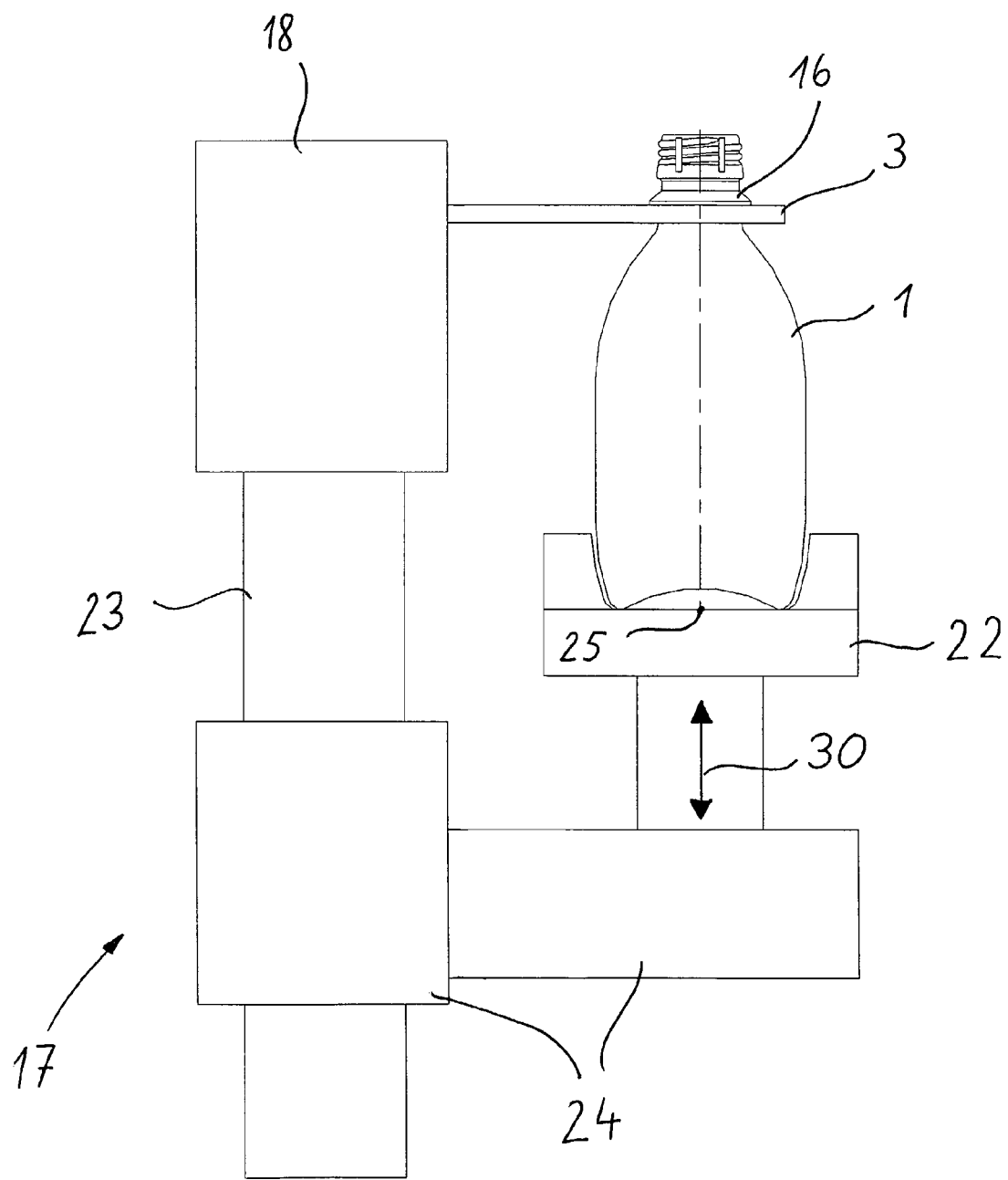
FIG. 5 shows a side view of a container cooling installation.

FIG. 5 shows a container cooling installation 17, as attached in FIG. 1 as module M in the transport section T. The container 1 is held by a gripping element 3 under the support ring 16. The gripping element 3 is attached to a transport element 18, which in turn is attached to a shaft 23. A holder 24, which can be moved vertically in the direction 30, is attached to the shaft 23, and it receives a bottom cup 22. The bottom cup 22 is an element which is approximately adapted to the bottom shape of the container 1, and which can be brought in engagement and disengagement with the bottom of the container 1 by the vertical mobility in the direction 30. As a result of the engagement, a more or less pronounced contact develops between the bottom cup 22 and the bottom of the container 1, so that the latter is cooled. The better the contour of the bottom cup 22 is adapted to the contour of the container bottom, the better the cooling is. The bottom cup 22 can also be force cooled (for example, by cooling ducts through which cooling media flow). An additional possibility of cooling the container bottom consists in dripping a cooling medium—for example, nitrogen—in the middle 25 of the bottom cup 22, before the engagement of the bottom cup 22 with the container bottom, where the cooling medium evaporates and, as contact is established between the container 1 and the bottom cup 22, cools the container bottom.

In addition, it is conceivable to fill the bottom cup 22 with a liquid cooling medium, so that at least the container bottom is immersed into the fluid for the purpose of cooling. The cooling medium is preferably water. In this variant of the disclosure, it is advantageous to connect the bottom cup 22 with a cooling medium reservoir, so that the fluid level can be maintained at a nearly constant level.

We claim:

1. Method for transporting containers (1), which present a support ring (16) comprising:
   moving a plurality of containers (1) through at least one transfer area (2) in which the containers (1) are held by gripping elements (3, 3', 3") alternately on different sides of the support ring (16), the gripping elements (3, 3', 3") presenting the same direction of movement at least in the transfer area (2), wherein the gripping elements are moved in the area of a circular element (6) in the radial direction to a common rotation axis (A).

2. Method according to claim 1, and rotating the gripping elements (3, 3', 3"), at least in the transfer area (2), about a common rotation axis (A) and in two parallel, superposed, planes (Uu, Uo), so that they overlap at least partially in a radial direction.

3. Method according to claim 1 and moving the containers (1), before the transfer into the transfer area (2), through at least a processing machine (4).

4. Method according to claim 1, wherein, in the transfer area (2), a gripping element pair (3, 3") is associated with each container (1).

5. Method according to claim 1, and receiving each of the containers (1), at the time of the transfer into the transfer area (2), by an upper or a lower gripping element of the gripping element pair (3, 3"), depending on whether the containers (1) are to be held below or above the support ring (16) before the transfer to the transfer area (2), and the other gripping element (3, 3") of the gripping element pair (3, 3"), at the time of the transfer into the transfer area (2), assuming a position which is radially internal in the direction of the common rotation axis (A).

6. Method according to claim 1, wherein, after the containers (1) have been transferred into the transfer area (2), causing a retracted one of the gripping elements (3, 3") to undergo a radial movement in the direction towards the associated container (1), and grip the latter at one of the mouth or neck area.

7. Method according to claim 1, wherein the gripping element (3, 3"), which receives the associated container at the time of the transfer of the container (1) into the transfer area (2), undergoes a radial movement in the direction of the common rotation axis (A), and thus releases the container (1), so that it is now held only by a gripping element (3, 3").

8. Method according to claim 1, wherein the described movement course occurs during the transport of the container (1) through the transfer area (2).

9. Method according to claim 1, and controlling the movements of the gripping elements (3, 3', 3") by cam disks (5).

10. Method according to claim 1, and gripping each of the containers using a first gripping element (3") directly above or below on the support ring (16), while a second gripping element (3) grips the container (1) at the body or at the bottom.

11. Device for transporting containers (1), comprising a plurality of containers presenting one of a support ring (16) and a plurality of gripping elements (3, 3', 3") attached to endless circulating transport elements (18), the gripping elements (3, 3") being movable at least in sections, in pairs, in parallel planes (Uu, Uo) about a common rotation axis (A) wherein the gripping elements (3, 3', 3") are movable in the area of a circular element (6) in the radial direction to the common rotation axis (A), wherein the gripping elements (3, 3") of a pair are superposed, at least in the area of the circular element (6), in two parallel planes (Uu, Uo), so that they one of overlap at least partially or are aligned, and wherein the axial separation between superposed gripping elements (3, 3") has a size such that the gripping elements (3, 3") can contact above and below the support ring (16).

12. Device according to Claim 11, wherein the radial movement of the gripping elements (3, 3', 3") occurs by a control with cam disks (5).

13. Device according to claim 11, wherein characterized in that the gripping elements (3, 3', 3") are actively controllable.

14. Device according to claim 11, wherein the gripping elements (3, 3', 3") are designed so they can be actuated passively.

15. Device according to claim 11, wherein in each case, one gripping element (3, 3', 3") of the gripping element pair (3, 3") is passively controllable and one gripping element (3, 3") is actively controllable.

16. Device according to claim 11, wherein an endless transport element is movable on a circular track with a radius (R), while another endless transport element (18) is also movable on straight sections (B), and its track presents the same radius (R) only in sections when the rotation is about a common rotation axis (A).

17. Device according to claim 16, and processing units (8, 9, 11) located one of on or in the sections (B, C) of the track.

18. Device according to claim 17, wherein the processing units (8, 9, 11) are one of inspection machines for controlling the bottom, the side wall (9) and the mouth (11), laser labeling units (8), or container cooling units (17).

19. Device according to claim 17, wherein the processing units (8, 9, 11) are constructed in a modular way, and a transport section (T) can be one of elongated or shortened by the addition or removal of modules (M) with processing units (8, 9, 11).

20. Device for transporting containers (1) according to claim 17, wherein the gripping units are attached to endless circulating transport elements (18), and wherein the container cooling installation (17) is a bottom cooling unit.

21. Device according to claim 20, wherein the bottom cooling unit can be operated with air.

22. Device according to claim 20, wherein the bottom cooling unit is connected with the processing machine (4), so that it can be operated with recycling air from the processing machine (4).

23. Device according to claim 20, wherein each container (1) is associated in the container cooling installation (17) with at least one cooling element (21), which can be brought at least partially in one of engagement or disengagement with the bottom of the container (1).

24. Device according to claim 23, wherein the cooling element (21) comprises a bottom cup (22) through which a cooling medium flows, and whose shape matches approximately the contour of the bottom of the container (1).

25. Device according to claim 23, wherein a vacuum can be applied to the bottom cup (22).

26. Device according to claim 23, wherein nitrogen can be applied to the cooling element (21).

27. Device according to claim 23, wherein the cooling element (21) is designed in such a way that a liquid cooling medium can be applied there to, and at least the bottom of the container (1) can be immersed into the cooling medium.

28. Use of a device according to claim 11, in an installation for one of the manufacture, filling, labeling or closing of containers (1).

29. The method according to claim 3, wherein the processing machine is one of a rotation stretch molding machine or a filler.

30. Device according to claim 13, wherein the gripping elements (3, 3', 3") are actively controllable by one of cams or controllable adjustment elements.

31. Device according to claim 30, wherein the controllable adjustment devices are pneumatic cylinders.

32. Device according to claim 14, wherein the gripping elements (3, 3', 3") are actuated passively by spring force.

* * * * *